Figure 1:
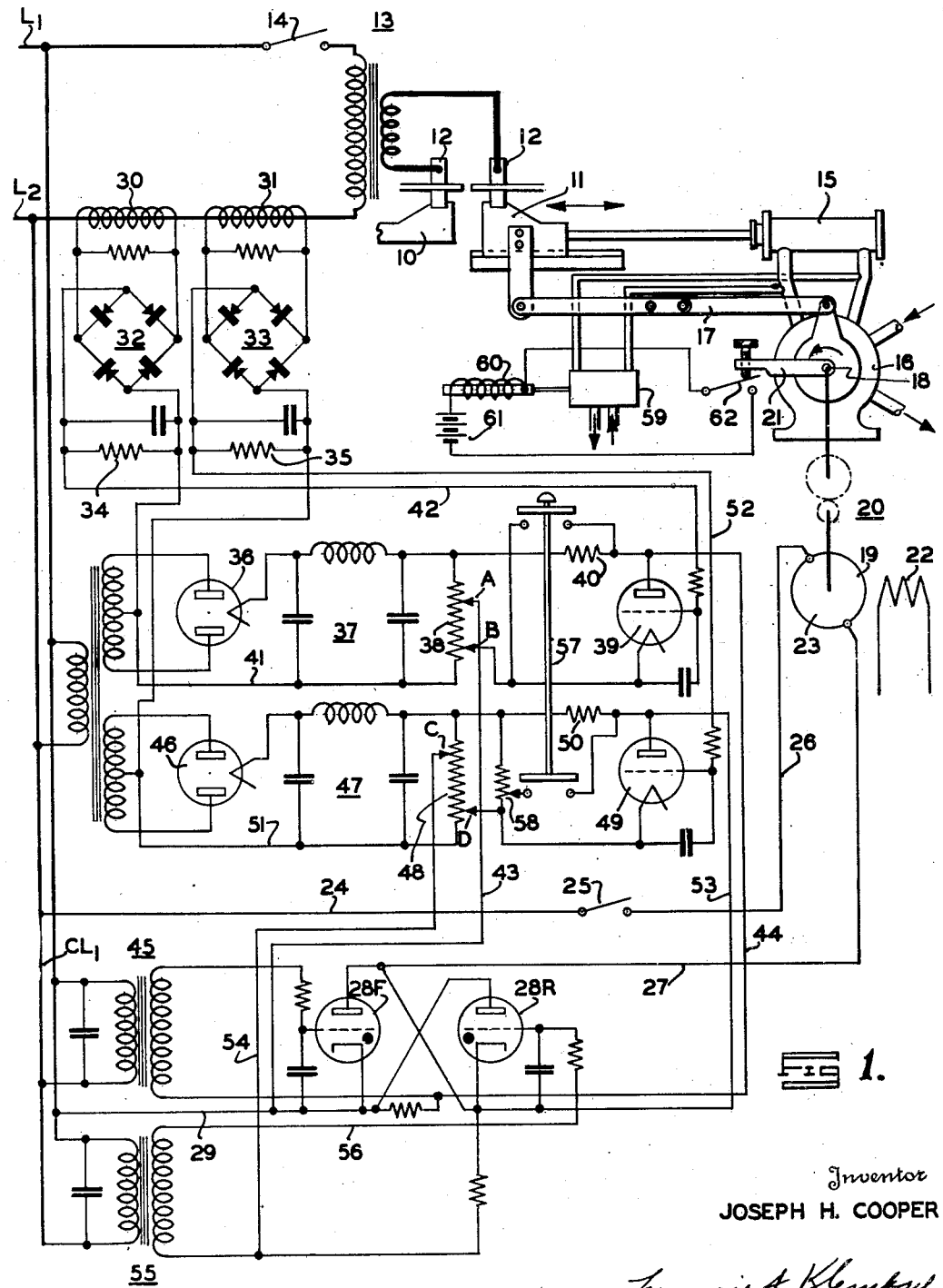

Inventor
JOSEPH H. COOPER

July 23, 1946.  J. H. COOPER  2,404,620
CONTROL OF FLASH WELDING
Filed Feb. 1, 1944    2 Sheets-Sheet 2

Inventor
JOSEPH H. COOPER
By Francis J. Klempay
Attorney

Patented July 23, 1946

2,404,620

UNITED STATES PATENT OFFICE 2,404,620

CONTROL OF FLASH WELDING

Joseph H. Cooper, Warren, Ohio, assignor to The Taylor-Winfield Corporation, Warren, Ohio, a corporation of Ohio Application February 1, 1944, Serial No. 520,582

10 Claims. (Cl. 219—4)

This invention relates to electric flash welding and more particularly to methods and devices for effecting and controlling during the welding cycle the movement relative to each other of the work pieces to be joined. The methods and devices herein disclosed are particularly advantageous in connection with the flashing period of the welding cycle, it being understood that normally the complete flash-butt welding cycle comprises a first period in which the work pieces are brought together with current passing through them to preheat the edges, the second or flashing period during which the edges are spaced apart and an electric arc maintained between them, and the final act of jamming the edges together to upset the edges and effect a uniform cohesive weld throughout the extent of the section. As the flashing progresses the metal of the edges is burnt or blown off and it becomes necessary to move the work pieces toward each other to maintain the arcing or flashing.

Heretofore the moving of the work pieces toward each other during the flashing period has been accomplished by suitable apparatus under either manual control or automatic control of the type in which the relative movement is regulated according to a predetermined time-position pattern. This latter mode of operation is usually accomplished by employing a moving cam for controlling a hydraulic valve in metering the flow of hydraulic fluid to the work moving means, the cam being made up of a multiplicity of separable segments which can be suitably rearranged to effect different cam contours. The manual method of control requires the constant attention of a highly skilled operator in order that the required degree of consistency and uniformity may be attained in the welding while experience has shown that optimum flashing action cannot always be obtained by predetermined settings of the controlling cam in an automatic system.

It is accordingly the primary object of the invention to provide an improved arrangement, in an electric flash welding machine, for controlling the movement of the work pieces toward each other during the flashing period of the complete welding cycle whereby optimum flashing conditions are automatically maintained irrespective of the presence of the various factors which render automatic systems heretofore devised for the purpose wholly unreliable. In accordance with the present invention, this general object of the invention is accomplished by controlling the relative movement of the work pieces directly in accordance with the instantaneous condition or length of the arc or flash itself. To arrive at reference conditions variable in accordance with the condition of the arc either the voltage across the arc or the current flowing in either the primary winding or the secondary winding or both these windings of the welding transformer employed is measured and through suitable relay mechanisms, preferably of the electronic type, the relative movement of the work pieces is continuously controlled in accordance with variations in the reference condition or conditions thus obtained.

A further object of the invention is the provision of an improved arrangement for automatically controlling the relative movement of the work pieces during the flashing period of a flash-butt welding cycle together with an improved arrangement for shifting the control of the relative movement of the work pieces from manual to automatic operation or vice versa as desired.

Another object of the invention is the provision, in an electric flash-butt welding apparatus, of an improved arrangement for manually controlling the relative movement of the work pieces during the welding cycle including the flashing period thereof.

A still further object of the invention is the provision, in electric flash-butt welding apparatus, of an improved arrangement for manually controlling the relative movement of the work pieces during the welding cycle including the flashing period thereof together with an improved arrangement for shifting from such manual control to an automatic control at the will of the operator.

The above and other objects and advantages of the invention will be more fully understood upon consideration of the following detailed specification and the accompanying drawings wherein there is specifically disclosed certain preferred embodiments of the invention.

Figure 2:
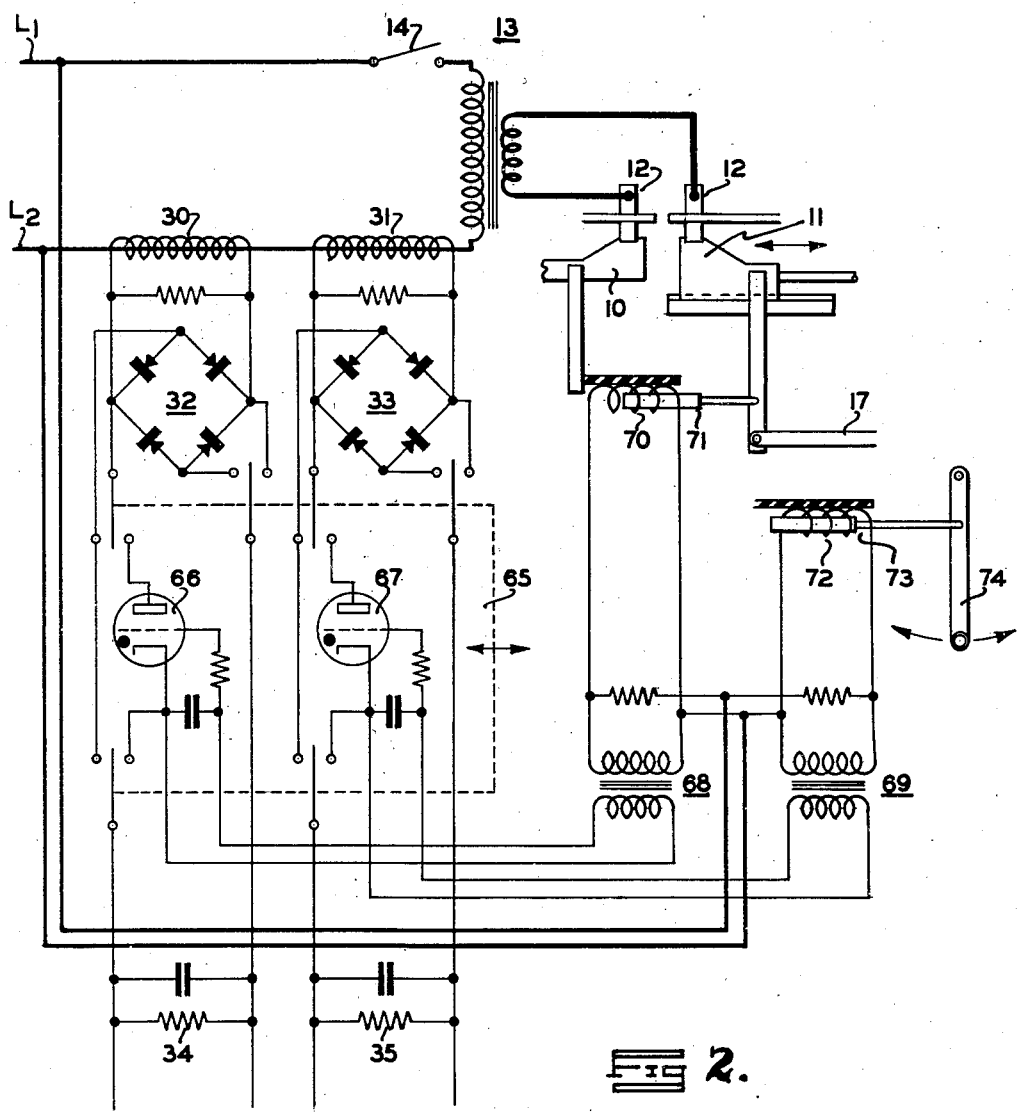

In the drawings:

Figure 1 is a schematic representation of electric flash welding apparatus constructed in accordance with the principles of the invention; and Figure 2 is a schematic representation of a modified part of the apparatus of Figure 1.

The apparatus illustrated includes a normally fixed platen 10 and a movable platen 11 of an electric flash welding machine and, in accordance with usual practice, these platens are each arranged to carry electrodes 12 which are operative to clamp the two work pieces to be welded together to the respective platens whereby the work pieces will have relative movement in accordance with relative movement between the platens. The electrodes also conduct welding current to the work pieces and for this purpose are connected to the terminals of the secondary winding of the welding transformer 13. The primary winding of welding transformer 13 is arranged to be connected to a suitable source comprising the line conductors L1 and L2 through a suitable circuit controlling device 14. While this device 14 is shown in the drawings, for simplicity of illustration, as being simply a switch it will be understood that in actual practice such device will ordinarily be of the current modulating type under either manual or timed automatic control.

Movable platen 11 of the welding machine is arranged to be moved toward and away from the fixed platen 10 by a hydraulic cylinder 15 under control of a follow-up valve 16. As such, this valve has a movable element which is connected to the movable platen by means of a link 17 and a coacting movable element which is moved upon rotation of shaft 18. Valve 16 as well as the movable platen driving means generally may be similar to that shown more in detail in the copending application of C. E. Coates, Serial No. 431,364, filed February 18, 1942, for "Hydraulic butt welder control," now Patent No. 2,373,226, dated April 10, 1945. Shaft 18 is coupled with the output shaft of a direct current motor 19 through a suitable speed reducing mechanism 20 and, for a purpose to be later described, an operating arm 21 is also keyed to the shaft 18.

Motor 19 is provided with a field winding 22 which may be connected to any suitable source of uni-directional current and an armature 23 which rotates in one or the other direction depending on the direction of current flow through it. Armature current for motor 19 is derived from a control current supply line CL1 through conductor 24, a suitable current controlling device 25, conductor 26, armature 23, conductor 27, discharge devices 28F and 28R connected in inverse parallel and conductor 29 back to line CL1. The discharge devices 28F and 28R are preferably of the grid controlled gaseous type each having a circuit connected to its control grid for determining the point on the respective positive and negative half wave cycles at which conduction in the respective devices is initiated. In this manner the direction and intensity of the current flow through the armature 23 of the motor 19 may be readily controlled. Thus if, for example, the tube 28F is regulated to start conducting earlier on its half wave than the tube 28R the resultant component of current will flow through the armature 23 in such manner as to cause the armature to rotate in a direction to move the platen 11 toward the platen 10. If the firing point of tube 28F is further advanced motor 19 and consequently platen 11 is speed up.

As explained above, the instantaneous value of the strength of current flowing in the primary winding of the welding transformer may be taken as an indication of the condition of the flashing during the flashing period since if the arc is too short for optimum operation an excessive current is being drawn while if the arc is lengthened to the point where extinguishment becomes probable the current is very materially decreased. Therefore I may employ current transformers 30 and 31 the outputs of which are rectified at 32 and 33, respectively to develop across resistances 34 and 35, respectively, potentials which are proportional to the strength of current flowing in the primary winding of the welding transformer 13. I utilize the instantaneous values of the potentials developed across resistances 34 and 35 to control the operation of the valves 28F and 28R in a manner now to be described.

Deriving energy from the current supply line CL1 is a rectifier 36 the output of which is smoothed out at 37 to develop a uniform potential across resistor 38, which resistor is provided with sliding contacts A and B and connected across the positive terminal of the resistor 38 and the contact B thereof is a grid-controlled space discharge device 39 and a load resistor 40 in series. Resistor 34 is in the grid-controlled circuit for tube 39 through contact B, conductor 41, resistor 34, and conductor 42 to the control grid of tube 39. Thus when no current is flowing through the primary of the welding transformer 13 tube 39 is held non-conducting by the negative bias furnished by the resistance 38 from point B to the negative terminal thereof but upon the appearance of a predetermined opposing potential across resistor 34 as caused by the flow of current to the primary of transformer 13 the tube 39 begins to conduct to develop across resistor 40 a potential which in a circuit now to be described is in opposition to the potential appearing between contact A of resistor 38 and the positive terminal thereof. This latter potential is utilized to hold the valve 28F normally conducting, the control circuit for valve 28F being traceable from the cathode thereof through conductor 43, contact A, resistor 40, conductor 44, the secondary of a biasing transformer 45 to the control grid of valve 28F. The alternating component furnished this circuit by the transformer 45 is fixed at a 90° phase angle with respect to the anode-cathode voltage appearing across the valve 28F. Therefore it will be apparent that valve 28F is normally fully conductive tending to rotate motor 19 and the motor connected element of the control valve 16 in a direction to cause movement of platen 11 toward platen 10.

A control system similar, in general, to the above is provided to control conduction in valve 28R in response to the instantaneous potential developed across resistor 35 although the effect is reversed in that a heavier welding current results in increased, rather than decreased, conduction in the valve 28R. Thus I provide a rectifier 46 deriving energy from the supply line CL1 and developing its output, after smoothing out at 47, across a resistor 48 which is provided intermediate its terminals with sliding contacts C and D. A controlled space discharge device 49 and a load resistor 50 is connected across the positive terminal and the contact D of the resistor 48 and the control circuit for tube 49 is traceable from the cathode thereof through contact D, conductor 51, resistor 35, and conductor 52 to the control grid of tube 49. Again a portion of the potential across resistor 48 is utilized to hold the tube 49 non-conducting and upon the appearance of a predetermined potential across resistor 35 the tube 49 begins to conduct to pass current in proportion to the value of the potential developed across resistor 35. As the tube 49 conducts it develops across resistor 50 a potential which, in the circuit now to be described, is in opposition to the potential across that portion of the resistor 49 which is intermediate the positive terminal thereof and the contact C. This last mentioned circuit is the control circuit for valve 28R which is traceable from the cathode thereof through conductor 53, resistor 50, resistor 48 to contact C, conductor 54, the secondary of a grid biasing transformer 55, conductor 56 to the control element of valve 28R. While the alternating component furnished this circuit by the transformer 55 is displaced by 90° in phase with respect to the anode-cathode voltage across the valve 28R the negative direct component applied between the positive terminal and contact C of resistor 48 is sufficient to hold the valve 28 normally non-conducting. However, when tube 49 begins to conduct the opposing direct potential supplied by resistor 50 will cause valve 28R to conduct current in an amount determined by the value of the potential developed across resistor 35.

It should now be apparent that upon the work pieces being clamped by the electrodes 12 and the closure of the circuit controlling devices 14 and 25 motor 19 will operate to advance platen 11 to bring the work pieces together and upon such short-circuiting of the welding transformer very heavy current will be drawn by the primary thereof which condition will be at once sensed by the transformers 30 and 31 and the potentials consequently appearing across resistor 34 and 35 will operate to decrease or terminate conduction in valve 28F while initiating the increasing conduction in valve 28R. Depending on the nature and character of the work, the voltages applied, and other factors, the movable platen 11 will either stop or back up slightly but in either case the arcing or flashing between the work pieces will be initiated and maintained because the balance of the system is so adjusted for the particular work at hand that the interval between the pieces will be maintained to produce optimum flashing. If the arc lengthens to the point where it is about to become extinguished or if it is extinguished the current in primaries of the transformers 30 and 31 decreases to such value that valve 28F passes much more current than valve 28R so that motor 19 rotates in a direction to again move the platen 11 toward the platen 10. In this manner the work pieces in the welding machine are automatically moved relative to each other in such manner that optimum flashing between the pieces is maintained.

Under certain conditions it may be desirable to back off the platen 11 under manual control during the time that the switch 25 and the circuits are otherwise conditioned for automatic operation. For this purpose I may provide a double poled switch 57 one contactor of which connects contact B of resistor 38 to lead 44 to drive the grid of valve 28F highly negative thus extinguishing this valve. The other contactor of switch 57 connects lead 53 with contact D of resistor 48 through a variable resistance 58 to drive the grid of valve 28R highly positive thus conditioning this valve for maximum conduction.

Upon completion of the flashing phase of the welding cycle it is necessary that the work pieces be rapidly brought into pressure engagement with each other and for this purpose I may employ a dumping valve 59 also connected to the cylinder 15 and operative, when its operating solenoid 60 is energized, to rapidly conduct a large volume of hydraulic fluid under pressure to the outer end of cylinder 15 all in a manner more fully explained in the above mentioned co-pending application. The energization of solenoid 60 may be either time-controlled or controlled in accordance with the position attained by the movable platen as related to the initial position of the platen at the start of the complete welding cycle. For controlling according to the latter method I may provide an energizing circuit for solenoid 60 which includes a current source 61 and a switch 62 which is closed upon the arm 21 reaching a predetermined advanced position. Since arm 21 is keyed to one of the coacting movable elements in follow-up valve 16 switch 62 will not be closed until the desired amount of metal is burned off the edges of the work pieces which are to be joined. It should also be understood that the arm 21 may be employed to open, either directly or through time delay apparatus, the circuit controlling device 14.

Under certain conditions it may be desirable to provide for the regulation of the movement of the movable platen either manually or automatically at the will of the operator and in Figure 2 I have shown a portion of the circuit of Figure 1 in modified form whereby the machine may be readily put on manual or automatic operation. Referring to Figure 2, I provide a multiple poled switch or relay structure shown schematically at 65 which is operative, when its operating element is moved to the left as viewed in Figure 2, to connect the outputs of rectifiers 32 and 33 across the resistors 34 and 35 in the same manner as in Figure 1 thus providing for wholly automatic operation. When the switch 65 is moved to the right the secondaries of transformers 30 and 31 are connected across the resistors 34 and 35, respectively, through the discharge devices 66 and 67, respectively, which are preferably of the grid controlled gaseous type. Conduction in tube 66 is controlled by an impulsing transformer 68 the primary of which is connected across the supply line L1, L2 through the resistance shown and, similarly conduction in tube 67 is controlled by an impulsing transformer 69, the primary of which is also connected across the line L1, L2 through the resistance shown. In parallel with the primary of transformer 68 is a variable reactor having a coil 70 which is fixed physically with respect to normally stationary parts of the welding machine and a soft iron core 71 arranged to be moved further into the coil 70 upon movement of the platen 11 toward the platen 10. As the core 71 moves toward the center of the coil 70 the reactance of the coil 70 diminishes thereby bringing the output of the transformer 68 closer in phase with the anode-cathode voltage across tube 66 causing this tube to conduct more current which is induced in the secondary of transformer 30 upon the flow of current through the primary of transformer 13. In parallel with the primary of transformer 69 is a variable reactor having a fixed coil 72 and a soft iron core 73 which is arranged to be moved toward and away from the center of coil 72 by a manually engageable lever 74 and it will be understood that as the lever is moved to the left, bringing core 73 closer toward the center of coil 72 the value of the reactance of coil 72 will diminish thereby bringing the output of transformer 69 more closely in phase with the anode-cathode voltage across tube 67 to increase conduction in this tube. The mechanical linkages and the parameters of the electrical circuits are so adjusted that with the platen 11 fully removed from the platen 10 and the lever 74 also removed to its right position the valves 28F and 28R conduct equal current so that the armature of motor 19 is locked and the mechanical parts of the machine are at rest. It should be noted that upon closing of the device 14 in the welding transformer primary circuit the magnetizing current flowing in this circuit furnishes sufficient energy for translation through transformers 30 and 31 and tubes 66 and 67 to develop sufficient potentials across resistors 34 and 35 to effect this mode of operation, it being understood that resistors 34 and 35 of Figure 2 are connected into the current modulating circuits for armature 23 in the manner shown in Figure 1. In the stated position of the parts we may assume that the core 73 is in the center of coil 72 while the core 71 is off to the right of the center of the coil 70. Now if the lever 74 is moved to the left the reactance of coil 72 is diminished decreasing the potential across resistor 35 and consequently decreasing the current being passed by valve 28R. The forward component of the current then furnished armature 23 overbalances and the armature rotates in the proper direction to move platen 11 to the left. Upon such movement reactance of coil 70 is diminished, the ultimate effect of which is to diminish the current passed by valve 28F and in this manner a balance may be maintained whereby the movement of the platen 11 follows precisely the movement of the lever 74. By providing switch 65 with an operating coil the operator may at any time either before, during or after the actual welding cycle transfer the control of the movement of the platen 11 from "manual" to "automatic" or vice versa. For example, it is contemplated that a control button for such actuating coil may be mounted directly on the lever 74 so that at any time upon release of the lever and button the control will automatically shift to "automatic." This is advantageous since in many cases it is desirable to preheat and initiate flashing under manual control after which automatic control of the flashing would normally be more desirable.

While in the embodiments specifically described above I have taken as the controlling reference condition the strength of current flowing in the primary winding of the welding transformer it should be understood that with suitable and obvious modification the condition may as well be a measure of the voltage appearing across the work pieces or a measure of the current flowing in the secondary winding of the welding transformer or any combination of these three factors.

The above specifically described embodiments of the invention should be considered as illustrative only as obviously many changes may be made therein without departing from the spirit or scope of the invention. Reference should therefore be had to the appended claims in determining the scope of the invention.

What I claim is:

1. In electric-flash-butt welding apparatus having a welding power transformer, a normally fixed platen and a movable platen adapted to hold work pieces, a hydraulic cylinder to move said movable platen, and a follow-up valve in control of the flow of fluid under pressure to opposite ends of said cylinder; the combination of means to move a movable control element of said follow-up valve comprising a direct current motor, and means to energize the armature of said motor in alternate directions and with controlled intensity comprising a source of alternating current and a circuit interconnecting said source and armature, said circuit including in series therein a pair of controlled electric discharge devices connected in inverse parallel relation.

2. Apparatus according to claim 1 further including means responsive to the value of a transitory electrical condition in the work circuit in control of the relative conduction in said devices whereby the speed and direction of movement of said movable control element of said follow-up valve is controlled so as to effect automatically optimum flashing between adjacent edges of said work pieces.

3. Apparatus according to claim 1 further including means responsive to the strength of current flowing through said transformer, control circuits intermediate said responsive means and the control elements of said devices, said control circuits being operative upon increase of transformer current to increase conduction in one of said devices while decreasing conduction in the other and vice versa whereby optimum flashing between adjacent edges of said work pieces may be automatically maintained.

4. Apparatus according to claim 1 further including means responsive to the value of a transitory electrical condition in the work circuit in control of the relative conduction in said devices whereby optimum flashing between adjacent edges of the work pieces may be automatically maintained, a manual control lever, means to establish an electrical condition variable in accordance with changes of position of said lever, and switching means operative to effect utilization of either said value or said condition at the will of the operator to control the relative conduction in said devices.

5. In electric flash-butt welding apparatus having means to move the work pieces toward and away from each other as well as means to conduct welding current thereto, the combination of means to control said means to move comprising a control element the direction and speed of movement of which determines the direction and speed of the relative movement between said work pieces, a direct current motor for driving said control element, an electric valve for controlling the flow of current through the armature in one direction, a second electric valve for controlling the flow of current through said armature in the opposite direction, and means to control the conduction in said first valve with respect to the conduction in said second valve whereby the direction and intensity of the current flowing through said armature is controlled.

6. Apparatus according to claim 5 further characterized in that said means to control the relative conduction in said valves comprises means responsive to the value of a transitory electrical condition in the work circuit whereby optimum flashing between adjacent edges of said work pieces may be automatically maintained.

7. Apparatus according to claim 5 further characterized in that said valves are of the controlled gaseous type connected in inverse parallel in a current supply circuit interconnecting an alternating current source and said armature, said means to control the relative conduction in said valves comprising means applying alternating grid potentials to the control elements of said valves, and means applying controlled direct current potential components to the control elements of said valves.

8. Apparatus according to claim 5 further characterized in that said valves are of the controlled gaseous type connected in inverse parallel in a current supply circuit interconnecting an alternating current source and said armature, said means to control the relative conduction in said valves comprising means applying alternating grid potentials to the control elements of said valves, and means applying controlled direct current potential components to the control elements of said valves, the values of said direct current components of biasing potentials being variable in accordance with the value of a transitory electrical condition in the work circuit whereby optimum flashing between adjacent edges of said work pieces may be automatically maintained.

9. In electric flash-butt welding apparatus having means to retain the work pieces to be joined and to conduct current thereto as well as means to move said pieces toward and away from each other, the combination of an electrical device in control of said means to move operative when energized to effect a force tending to move said pieces away from each other, a second electrical device operative when energized to effect a force tending to move said pieces toward each other, means to control the energization of one of said devices comprising means establishing an electrical condition variable in accordance with variations in the interval between said work pieces, a manually engageable element, and means to control the energization of the other of said devices comprising means establishing an electrical condition variable in accordance with variations in the position of said element.

10. Apparatus according to claim 9 further characterized in that said first and second mentioned electrical devices each comprises a controlled gaseous discharge device connected in inverse parallel for controlling the flow of current from an alternating current source, said first and second mentioned means to control comprising means to condition said devices for conduction at variable points during the respective half cycles of anode-cathode voltage applied across the respective devices by said source.

JOSEPH H. COOPER.